3,346,285
BORE CENTERED COUPLING
Richard F. Miaskiewicz, Sr., Jeannette, Pa., assignor to Carrier Corporation, Syracuse, N.Y., a corporation of Delaware
Filed Oct. 18, 1965, Ser. No. 497,070
3 Claims. (Cl. 287—104)

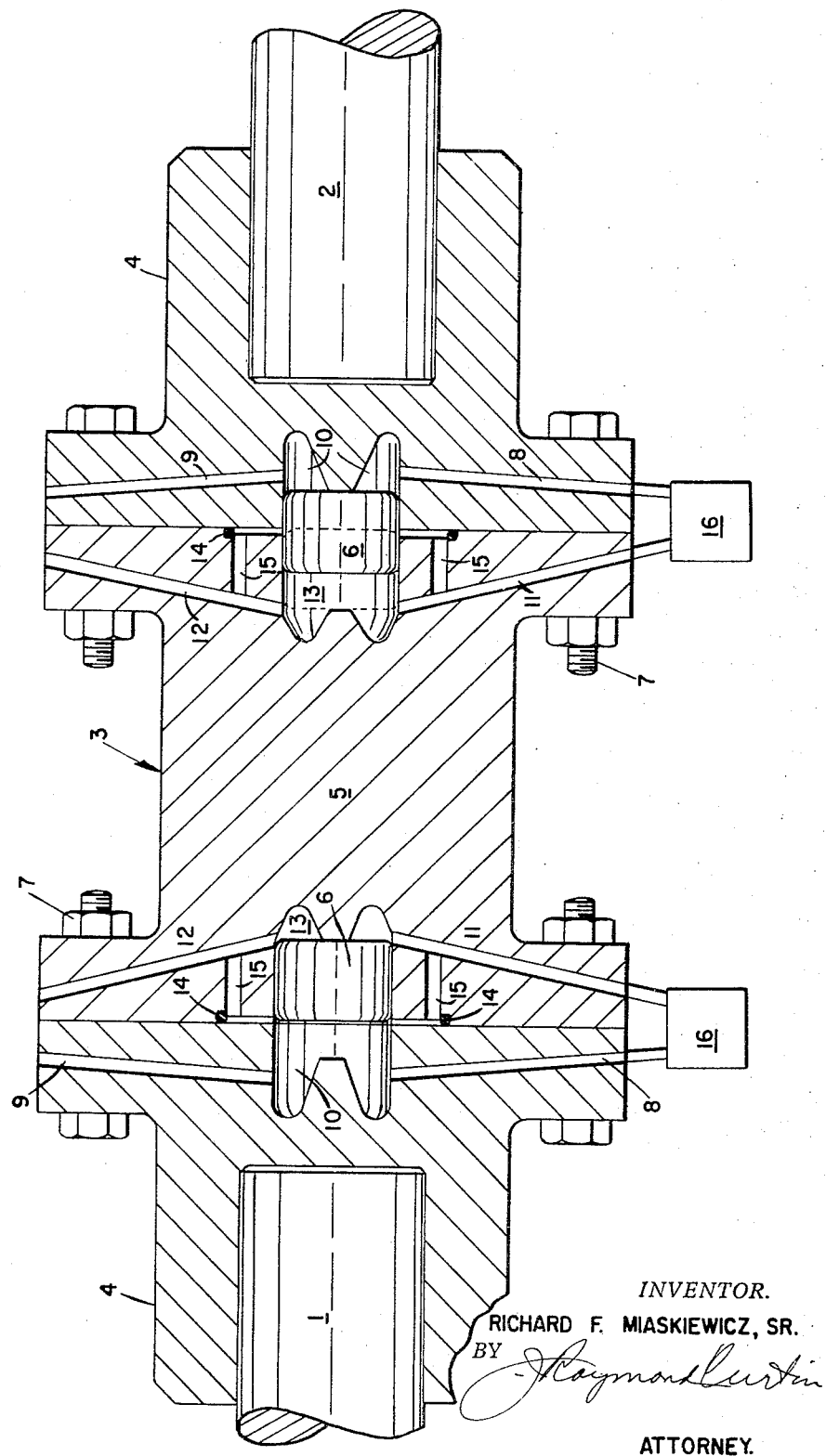

This invention relates broadly to alignment of structural elements. More particularly, this invention relates to a method and apparatus for aligning structural elements. Still more particularly, this invention relates to a coupling device incorporating a self-aligning feature for connecting axially aligned shafts, one of which is a driver shaft and the other a driven shaft.

In many applications, such as a shaft coupling device, it is advantageous to be able to obtain sufficient access clearance to assemble and disassemble the device without the necessity of axially displacing the elements. As applied to a shaft coupling, it is advantageous to be able to assemble and disassemble the coupling without displacing the driving or driven shafts (or the machines containing them).

To provide a coupling which is perfectly centered, most shaft couplings employ an arrangement of rabbets on one section of the coupling with mating projections on the other section. These couplings cannot be slid radially into place due to the centering projections.

It is therefore an object of this invention to provide a device for accurately aligning structural elements.

It is a further object of this invention to provide a method for accurately aligning structural elements.

It is another object of this invention to provide an accurately aligned coupling device.

It is a further object of this invention to provide a shaft coupling that can be assembled within very small axial access clearance.

The objects of this invention are obtained by providing a three section shaft coupling free of projections on the mating faces. Centering pins, placed in a central cavity at each end of the center section of the coupling are slid partially into the mating cavities in the two end or hub sections of the coupling after assembly to accurately center the three coupling sections. A unique arrangement is provided for manipulating the inaccessible centering pins. The coupling cavities are pressurized, causing the diameter of the cavities to increase sufficiently to provide a loose fit between the centering pins and the cavity walls.

A further increase in pressure in the center section cavities propels or floats the pins to a centered position. Subsequent depressurization of the cavities causes them to assume their original diameter, effectively "locking" the pins in centering position.

Other objects and features of this invention will be apparent from a consideration of the ensuing specification and drawing in which:

The drawing is an elevational view, partly in section, of the coupling assembly forming the subject of this invention.

Referring more particularly to the drawing, there is shown a coupling assembly 3 for drivably connecting the shafts 1 and 2 of rotary machines such as an electric motor and a compressor. Coupling assembly 3 consists of hubs 4 solidly mounted on shafts 1 and 2, coupling spacer 5 and centering pins 6. Hubs 4 are mounted on shafts 1 and 2 by any suitable means such as a shrink fit. Hubs 4 are drivably connected to coupling spacer 5 by bolts 7 extending through complementary flanges as shown. Hubs 4 have fluid passages 8 and 9 therein communicating with hub cavities 10. Coupling spacer 5 has fluid passages 11 and 12 therein communicating with coupling spacer cavities 13. Cavities 10 and 13 are accurately machined centrally of the mating faces of the spacer shaft and hubs. Pins 6 are accurately machined to provide an interference fit within cavities 10 and 13 and are pressed into cavities 13 prior to assembling the coupling. Seals 14 are provided between coupling spacer 5 and hubs 4 to prevent fluid leakage along the mating faces thereof. Fluid passages 15 are provided in the coupling spacer 5 between seals 14 and fluid lines 11 and 12.

To assemble this coupling, centering pins 6 are pressed into cavities 13 of coupling spacer 5 to recess them therein. The spacer is then slid into a reasonably accurate position between hubs 4 and bolted thereto. Fluid from a fluid pressure source 16 is introduced into passages 8 and 11 until all passages and cavities are filled with fluid. Passages 9 and 12 are then plugged. Pressure in the cavities and passages is then increased causing seals 14 to be further deformed by fluid in passages 15 to prevent fluid leakage between the hubs and the coupling spacer. When sufficient pressure is built up in cavities 10 and 13 to enlarge their bores so that centering pins 6 are no longer of an interference fit, pressure in cavities 10 is maintained constant and pressure in cavities 13 is further increased to float or propel pins 6 into hub cavities 10. The pins are thus positioned partially in hubs 4 and partially in coupling spacer 5. Pressure is then decreased in cavities 10 and 13 in a manner insuring that the pressure of cavity 13 is at all times equal or greater than that of cavity 10 until pressure is completely released. The cavities and passages are then drained and the coupling is operational. The pins 6 are held in the assembled position by an interference fit in cavities 10 and 13 and provide accurate centering of the coupling elements.

While I have described a preferred embodiment of the invention, it will be understood that the invention is not limited thereto but may be otherwise embodied within the scope of the following claims.

I claim:
1. A coupling for transmitting rotary movement between a first and a second shaft comprising,
 a first-shaft engaging hub,
 a second-shaft engaging hub, each of said hubs having a central cavity therein,
 a coupling spacer having a central cavity at each end thereof,
 a centering pin disposed within each of said coupling spacer cavities, said pins having an interference fit in said cavities,
 means for securing said coupling spacer to said hubs,
 means for displacing said pins so that portions thereof are disposed within the central cavities of said hubs to align said hubs with said coupling spacer.
2. A shaft coupling according to claim 1 in which said displacing means comprises a source of high pressure fluid communicating with the cavities to increase the size of said cavities and propel said pins into position.
3. A method for aligning structural elements comprising the steps of:
 providing a central cavity in the mating surface of each element to be aligned, locating a centering pin in one of the central cavities so that it is completely recessed therein, connecting the elements to be aligned, suppling fluid under pressure to the cavities to cause each cavity bore to become temporarily enlarged, increasing the pressure in the cavity containing the centering pin to propel said pin into the cavity in the other element so that a portion of the pin is disposed in each cavity, releasing said pressure to allow the cavity bores to return to normal size, thereby locking said centering pin in position.

References Cited

UNITED STATES PATENTS

| | | | |
|---|---|---|---|
| 2,992,479 | 7/1961 | Musser | 285—381 |
| 3,114,566 | 12/1963 | Coberly | 285—18 |
| 3,145,467 | 8/1964 | Bodine | 285—332 |
| 3,150,571 | 9/1964 | Frassetto | 92—28 |
| 3,216,540 | 11/1965 | Blinn | 29—446 |
| 3,267,568 | 8/1966 | Johnson | 29—446 |
| 3,278,193 | 10/1966 | Groner | 29—427 |

CARL W. TOMLIN, *Primary Examiner.*

R. SKUDY, *Assistant Examiner.*